(12) United States Patent
Yang et al.

(10) Patent No.: US 7,685,453 B2
(45) Date of Patent: Mar. 23, 2010

(54) METHOD, SYSTEM, AND APPARATUS FOR RECEIVING POWER FROM A DOCKING STATION AND FEEDING BACK PROTECTED POWER

(75) Inventors: Chih Cheng Yang, Banciao (TW); Wen-Yung Chang, Zhong-Li (TW); Tsung-Yi Liu, Keelung (TW); Ching Ti, Taipei (TW)

(73) Assignee: Dell Products, LP, Round Rock, TX (US)

( * ) Notice: Subject to any disclaimer, the term of this patent is extended or adjusted under 35 U.S.C. 154(b) by 735 days.

(21) Appl. No.: 11/540,308

(22) Filed: Sep. 29, 2006

(65) Prior Publication Data

US 2008/0082697 A1    Apr. 3, 2008

(51) Int. Cl.
*G06F 1/00* (2006.01)
*G06F 11/30* (2006.01)

(52) U.S. Cl. .................. 713/340; 713/300; 320/137; 320/138; 323/276

(58) Field of Classification Search .......... 713/300, 713/340; 323/276; 320/137, 138
See application file for complete search history.

(56) References Cited

U.S. PATENT DOCUMENTS

| | | | | |
|---|---|---|---|---|
| 5,991,839 A | * | 11/1999 | Ninomiya | 710/303 |
| 6,119,237 A | * | 9/2000 | Cho | 713/300 |
| 6,556,410 B1 | * | 4/2003 | Manning et al. | 361/118 |
| 6,604,199 B1 | * | 8/2003 | Yang et al. | 713/300 |
| 6,888,338 B1 | * | 5/2005 | Popescu-Stanesti et al. | 320/137 |
| 7,019,954 B2 | * | 3/2006 | Manning et al. | 361/111 |
| 7,162,656 B2 | * | 1/2007 | Vogman | 713/340 |
| 7,330,984 B2 | * | 2/2008 | Wu et al. | 713/300 |
| 7,462,073 B2 | * | 12/2008 | Bell et al. | 439/639 |
| 7,595,615 B2 | * | 9/2009 | Li et al. | 323/277 |
| 2005/0050370 A1 | * | 3/2005 | Vyssotski et al. | 713/300 |
| 2006/0010330 A1 | * | 1/2006 | Wu et al. | 713/300 |
| 2006/0221528 A1 | * | 10/2006 | Li et al. | 361/100 |
| 2006/0242439 A1 | * | 10/2006 | Hupman et al. | 713/320 |
| 2006/0245131 A1 | * | 11/2006 | Ramey et al. | 361/90 |
| 2008/0030166 A1 | * | 2/2008 | Cato et al. | 320/111 |

* cited by examiner

*Primary Examiner*—Thomas Lee
*Assistant Examiner*—Jaweed A Abbaszadeh
(74) *Attorney, Agent, or Firm*—Larson Newman & Abel, LLP (57) ABSTRACT

The present disclosure relates to circuit protection within an information handling system and a media resource unit. In one form, an information handling system can include a first external input power port and an information handling system docking interface operable to be coupled to a media resource unit interface of a media resource unit. The media resource unit can include a second external input power port. The information handling system can also include a protection circuit including a first terminal and a second terminal. The first terminal can be coupled to the first external power port and operable to receive input power from the second external power port of the media resource unit. The second terminal can be coupled to the information handling system docking interface and operable to output protected power to the media resource unit interface.

19 Claims, 5 Drawing Sheets

METHOD, SYSTEM, AND APPARATUS FOR RECEIVING POWER FROM A DOCKING STATION AND FEEDING BACK PROTECTED POWER

FIELD OF THE DISCLOSURE

The present disclosure relates generally to information handling systems. More specifically, the present disclosure relates to power protection topologies for information handling systems and media resource units.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Some conventional information handling systems can be configured as notebooks or other portable computing systems that can use docking stations, port replicators, or media slice modules to extend functionality and provide access to additional resources. For example, various conventional lightweight notebook systems may lack resources such as Digital Video Disk (DVD) drives, serial and parallel communication ports, large capacity rechargeable batteries, or other resources in an effort to minimize the size and overall weight of lightweight notebook systems. Additional resources can be provided through the use of media slice modules that may be connected to the bottom or rear portion of a notebook system. For example, a media slice module when coupled to a notebook system to provides access to rechargeable batteries, optical drives, communication ports, external hard drives, floppy disk drives, or various other components. In this manner, a notebook system having limited resources can benefit from docking to a media slice modules to access additional resources without having to sacrifice mobility inherent to some conventional docking stations.

However, complications can arise when using media slice modules in combination with notebook systems. For example, combined resources and functionality of notebooks systems when connected to media slice modules can over task power distribution and recharge circuits. Additionally, conventional notebook systems and media slice modules are typically designed to comply with certain standards established by the Underwriters Laboratory (UL), an agency that establishes standards for verification testing of electronic devices. Additional UL protection circuits can be required to comply with safety requirements when increases in power consumption are required. However, employing additional UL protection circuits can increase the complexity of power topologies within notebook systems and media slice modules. As such, what is needed is a simplified power topology for notebook systems and media slice modules that comply with UL testing standards without causing increases in circuit complexity or component costs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect, an information handling system is disclosed. In one form, an information handling system can include a first external input power port and an information handling system docking interface operable to be coupled to a media resource unit interface of a media resource unit. The media resource unit can include a second external input power port. The information handling system can also include a protection circuit including a first terminal and a second terminal. The first terminal can be coupled to the first external power port and operable to receive input power from the second external power port of the media resource unit. The second terminal can be coupled to the information handling system docking interface and operable to output protected power to the media resource unit interface.

According to another aspect of the disclosure, a method of providing protected power within an information handling system is provided. The method can include detecting a coupling of an information handling system and a media resource unit and receiving input power from an external input port of the media resource unit. The method can further include coupling the input power to an input terminal of a protection circuit of the information handling system. The method can also include distributing protected power from an output terminal of the protection circuit to the media resource unit.

According to a further aspect of the disclosure, a media resource unit operable to be used in association with an information handling system is provided. The media resource unit can include an external input power port operable to receive input power from an external source and a media resource unit docking interface operable to be coupled to an information handling system docking interface. The unit can further include an energy distribution circuit operable to couple the input power to an external input power port of the information handling system and a protection circuit of the information handling system. The energy distribution circuit can be provided when the media resource unit docking interface and the information handling system docking interface are coupled.

Figure 1:
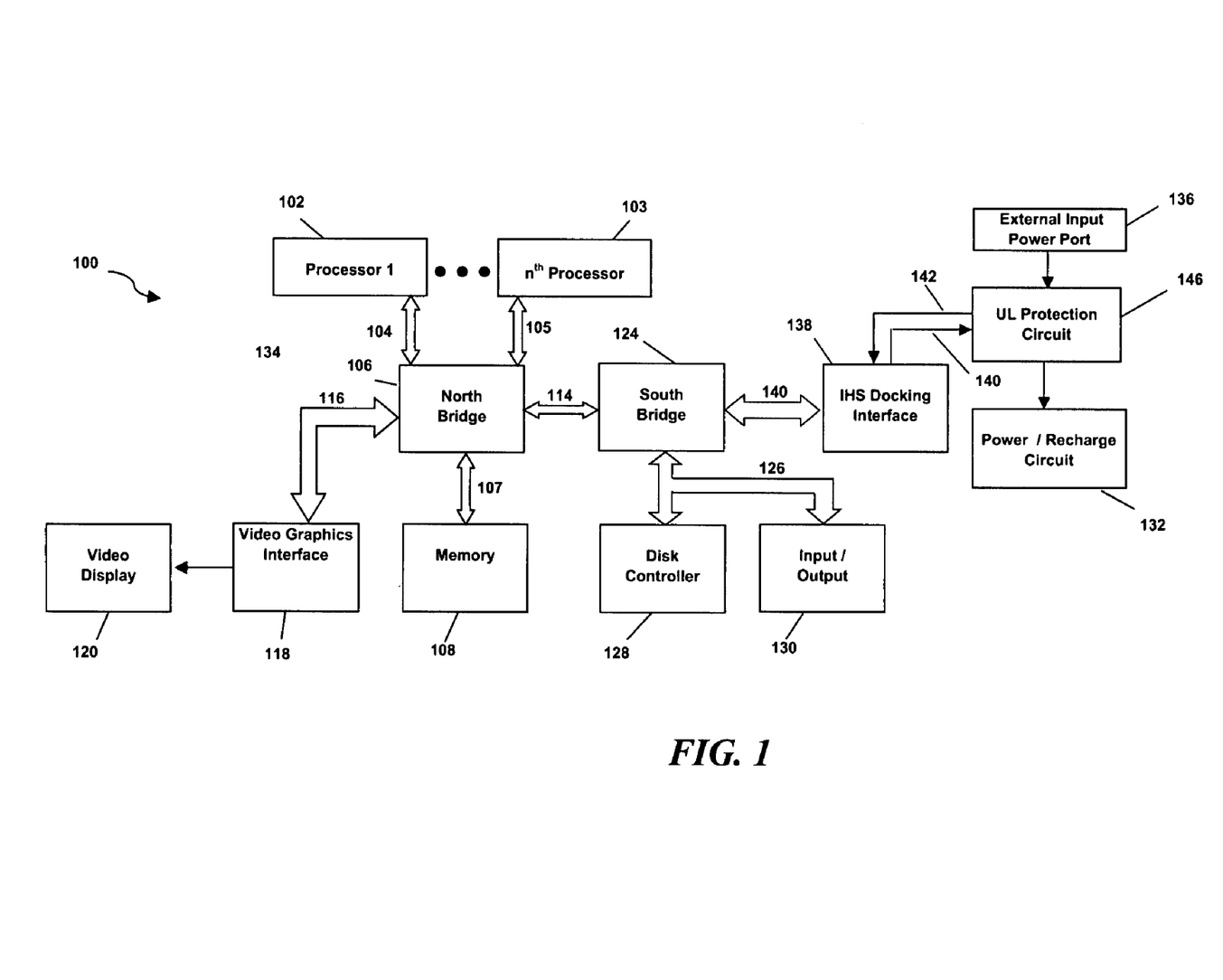
FIG. 1 illustrates a block diagram of an information handling system including a protection circuit and an information handling system docking interface in accordance with one aspect of the disclosure.

FIG. 1 illustrates a block diagram of an exemplary embodiment of an information handling system, generally designated at 100. In one form, the information handling system 100 can be a computer system such as a laptop computer or other portable information handling system. As shown in FIG. 1, the information handling system 100 can include a first physical processor 102 coupled to a first host bus 104. In one form, additional processors generally designated as an $n^{th}$ physical processor 103 can be used and coupled to a second host bus 105. The first physical processor 102 can be coupled to a north bridge 106 via the first host bus 104. Further, the $n^{th}$ physical processor 103 can be coupled to the north bridge 106 via the second host bus 105. The north bridge 106 can also be referred to as a memory controller hub or a memory controller, and the north bridge 106 can be coupled to a memory 108 via a third host bus 107. In a particular embodiment, the host buses 104, 105, and 107 can be individual buses or part of the same bus.

The north bridge 106 can provide bus control and can handle transfers between the host buses 104, 105, 107 and one or more other buses, e.g. a PCI bus 114, and an AGP bus 116 coupled to a video graphics interface 118 which can drive a video display 120. A third bus 126 can also include other industry standard buses or proprietary buses, e.g., ISA, SCSI, I2C, SPI, USB buses that can be coupled through a south bridge 124. For example, a disk controller 128 and input/output interface(s) 130 can be connected to the third bus 126 using industry standard buses or proprietary buses or respective interfaces or controllers. The information handling system 100 can further include a power/recharge circuitry 132 that can receive input power using an external input power port 136. The power/recharge circuit 132 can provide input power to power circuits of the information handling system 100 to power one or more components or electronic devices within the information handling system 100. In one embodiment, a charge adapter (not illustrated) can be coupled to the external input power port 136 to provide input power to power the information handling system 100.

According to one aspect, the north bridge 106 can be generally considered an application specific chip set that provides connectivity to various buses, and integrates other system functions such as a memory interface. For example, an Intel 820E, an 815E chipset, or any combination thereof, available from the Intel Corporation of Santa Clara, Calif., can provide at least a portion of the north bridge 106. The chip set can also be packaged as an application specific integrated circuit (ASIC). The north bridge 106 can generally include functionality to couple the memory 108 to other devices within the information handling system 100. Thus, memory controller function such as main memory control functions can reside in the north bridge 106.

According to another aspect, the south bridge 124 can be coupled to an information handling system (IHS) docking interface 138 using a docking interface bus 140. The IHS docking interface 138 can be used to provide access to a media resource unit such as media resource unit 200 of FIG. 2. In one form, a media resource unit can be used to extend resources and functionality of the information handling system 100. For example, a media resource unit can include an advanced port replicator (APR), a docking station, a media slice, or other modules, units, or components that can be coupled via the IHS docking interface 138. The IHS docking interface 138 can include a bus, connectors, terminals, plug, receptacles, or other type of interfaces that can be used to coupled the information handling system 100 to a media resource unit to access resources of a media resource unit.

In one embodiment, the IHS docking interface 138 can be provided along a rear or bottom portion of a housing (not illustrated) of the information handling system 100. The docking interface 138 can further include a power distribution circuit that includes an input power circuit 140 operable to couple input power provided via the IHS docking interface 138 to a UL protection circuit 146 of the information handling system 100. The power distribution circuit may also include an output power circuit 142 operable to output protected power provided by the UL protection circuit 146 to a media resource unit coupled to the IHS docking interface 138. For example, a media resource unit can be coupled to the input power circuit 140 and the output power circuit 142 when docked to the IHS docking interface 138.

During operation, the information handling system 100 can be attached or coupled to a media resource unit using the IHS docking interface 138 when additional resources are to be used by the information handling system 100. The IHS docking interface 138 can couple input power provided by the media resource unit to the UL protection circuit 146. The UL Protection circuit 146 can then output protected power using output circuit 140 to the IHS docking interface 138 to power the media resource unit using protect power. In this manner, the media resource unit may access the UL protection circuit 146 prior to using an input power provided to the media resource unit. According to one aspect, the information handling system 100 can also couple input power received from the media resource unit via the IHS docking interface 138 to the power/recharge circuit 132. As such, input power provided from the media resource unit 144 may be protected by the UL protection circuit 146 prior to distributing to power/recharge circuit 132 of the information handling system. In this manner, a media resource unit may provide input power to power the information handling system 100.

Figure 2:
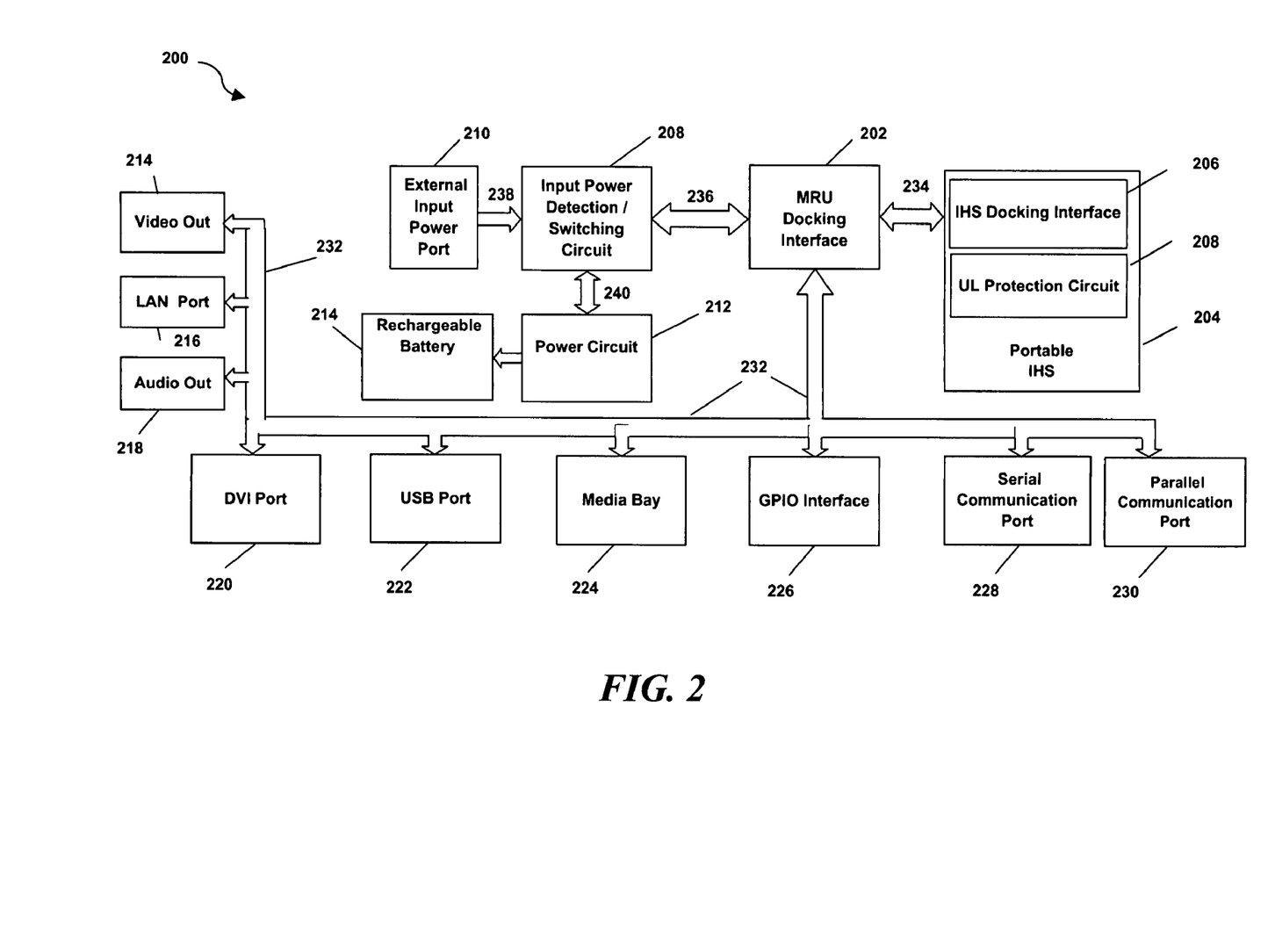
FIG. 2 illustrates a block diagram of a media resource unit for use with an information handling system according to another aspect of the disclosure.

FIG. 2 presents a block diagram of a media resource unit, generally designated at 200, and operable for use with a portable IHS 204 according to one aspect of the disclosure. The media resource unit 200 can include various types of docking units or modules including, but not limited to, a media slice, an advanced port replicator, a horizontal or vertical docking station, or other devices or modules that can be used to extend resources for the portable IHS 204.

The media resource unit 200 can further include a media resource unit (MRU) docking interface 202 that can be coupled to the portable IHS 204 using an IHS docking interface 206 of the portable IHS 204. The portable IHS 204 can also include a UL protection circuit 206 that can be accessed by the media resource unit 200 using the MRU docking interface 202 when coupled to the IHS docking interface 206 of the portable IHS 204. In one form, a coupling interface bus 234 can be used to couple one or more communication buses and one or more power distribution circuits (not illustrated) when IHS docking interface 206 may be coupled to MRU docking interface 202. The media resource unit 200 can also include an input power detection and switching circuit 208 coupled to an external input power port 210. The external input power port 210 can couple input power provided by an external charge adapter (not illustrated) to power the portable IHS 204 and the media resource unit 200. The media resource unit 200 can also include a power circuit 212 coupled to the input power detection and switching circuit 208 and can couple input power via power bus 240 to the power circuit 212 to charge or recharge a rechargeable battery 214.

According to another aspect, the MRU docking interface 202 can be used to couple the portable IHS 202 to various resources such as a video out port 214 which can be configured as Red/Green/Blue (RGB) video output port or other type of video port, a local area network (LAN) port 216 such as an Ethernet port, an audio out port 218 operable to couple headphones or a speaker assembly (not illustrated), and a digital video interface (DVI) port 220 operable to provide digital video signals including high definition video signals for digital flat-panel displays or projectors. The MRU docking interface 202 can also provide access to one or more USB ports 222 such as a USB 2.0 compliant communication port, a media bay 224 that can provide access to Read/Write (R/W) optical drives, Digital Video Disk (DVD) drives, floppy disk drives (FDDs), hard disk drives (HDDs), and other media devices. The MRU docking interface 202 can further provide access to a general purpose input output (GPIO) interface 226, serial communication ports 228, and parallel communication ports 230.

During use, the portable IHS 204 can be coupled to the media resource unit 200 using the MRU docking interface 202 and the IHS docking interface 206 of the portable IHS 204. The media docking interface bus 234 can provide a status signal to the IHS docking interface 206 indicating a docking of the portable IHS 204 and the media resource unit 200. In one form, a status signal can also be provided via a second docking interface bus 236 coupled to the input power detection and switching circuit 208. For example, status signals can be provided to the input power detection and switching circuit 208 from the MRU docking interface 202 when the portable IHS 204 may be connected and disconnected from the media docking interface 202. In one form, a status signal may be provided by a switch or digital circuit that may be biased to provide an indication of when the MRU docking interface 202 may be coupled or uncoupled to the IHS docking interface 206. Other forms of detection may also be employed.

According to one aspect, upon docking the MRU docking interface 202 to the IHS docking interface 206, a power input provided to the external input power port 210 can be protected using the UL protection circuit 208 of the portable IHS 204. For example, the input power provided by the external input power port 210 may routed via the input power detection/switching circuit 208 and the MRU docking interface 202 to the IHS docking interface 206 to access the UL protection circuit 208 of the portable IHS 204. For example, the portable IHS 204 can route the input power to the UL protection circuit 208 and protected power can then used by the portable IHS 204 to power associated electronics (not illustrated). Additionally, the protected power provided by the UL protection circuit 208 can be returned to the media resource unit 200 via the IHS docking interface 206 and the MRU docking interface 202. The protected power provided by the UL protection circuit 208 of the portable IHS 204 can be distributed to a power circuit of the media resource unit 200 to power electronics of the media resource unit 200. In this manner, the media resource module 200 can use the UL protection circuit 208 provided external to the media resource module 200 which can obviate the need for including a UL protection circuit internal to the media resource module 200.

In another embodiment, input power can be coupled to the external power port 210 when the portable IHS 204 may not be coupled to the media docking interface 202. For example, the input power detection and switching circuit 208 can route the input power to the power circuit 212 of the media resource unit 200 to charge the rechargeable battery 214. In another embodiment, the media resource unit 200 may not include a rechargeable battery 214 or may not require energy to charge the rechargeable battery 214.

Figure 3:
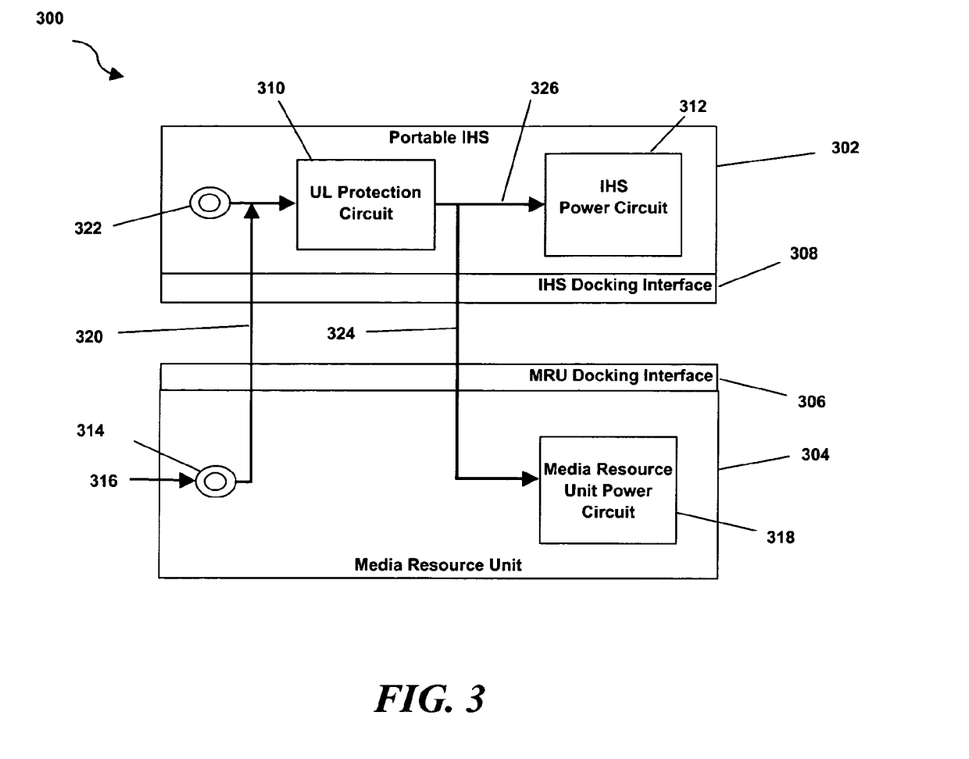
FIG. 3 illustrates a block diagram of an input power distribution topology for a portable information handling system and a media resource unit according to one aspect of the disclosure.

FIG. 3 illustrates a block diagram of an input power distribution topology, generally designated at 300, for a portable IHS 302 and an MRU 304 according to one aspect of the disclosure. The portable IHS 302 can be provided as a notebook computer and can be coupled to the MRU 304 using a MRU docking interface 306 and an IHS docking interface 308. In one form, the portable IHS 302 can include the information handling system 100 depicted in FIG. 1. Additionally, the MRU 304 can include the media resource unit 200 depicted in FIG. 2. However, other information handling systems or media resource units can also be employed.

In an exemplary embodiment, the portable IHS 302 can include a UL protection circuit 310 coupled to an first external input power port 322 of the portable IHS 302. The portable IHS 302 can further include an IHS power circuit 312 coupled to the UL protection circuit 310 to power electronics (not illustrated) of the portable IHS 302. In one form, the MRU 304 can also include a second external input power port 314 that can receive input power 316 from a charge adapter (not illustrated). The MRU 304 can include a media resource unit power circuit 318 to provide power to electronics (not illustrated) of the MRU 304. In one form, a first energy distribution circuit 320 can be provided when coupling the MRU docking interface 306 and the IHS docking interface 308. The first energy distribution circuit 320 couples the second external input port 314 of the MRU 302 to the first external input port 322 and the UL protection circuit 310. Additionally, a second energy distribution circuit 324 can be provided when coupling the IHS docking interface 308 to the MRU docking interface 306 and provides protected power to MRU 304 to power electronics of the MRU 304 using the media resource unit power circuit 318. In one form, the first energy distribution circuit 320 and the second energy distribution circuit 324 may include one or more conductors or conductive materials operable to couple power between the MRU 304 and the portable HIS 302.

During operation, the MRU 304 can receive the input power 316 from a power source such as a charge adapter or other power source. For example, a user can plug a charge adapter (not illustrated) into the second external input port 314 to provide the input power 316. In one form, the input power 316 can include a direct current (DC) power. The input power 316 can be coupled to the portable IHS 302 using the first energy distribution circuit 320 during a coupling or docking of the portable IHS 302 to the MRU 306. Upon providing the input power 316 to the IHS docking interface 308, the input power 316 can then be coupled to the UL protection circuit 310 of the portable IHS 302 to provide circuit protection for the input power 316. For example, the UL protection circuit 310 can include a UL certified protection circuit that can be used to ensure electric shock or damaging power levels may not be provided to either the portable IHS 302 or the MRU 304. In one form, the UL protection circuit 310 can be provided to regulate the maximum amount of power that can be output by the UL protection circuit 310. The UL protection circuit 310 can output protected power 326 that can be used to power electronic devices of the portable IHS 302 using the IHS power circuit 312. Similarly, the protected power 326 can also be coupled to the MRU 304 using a second power distribution circuit 324 operable to couple protected power 326 to the MRU 304. In this manner, the MRU 304 can use the UL protection circuit 308 of the portable IHS 302 for the input power 316 input to the MRU 304.

Figure 4:
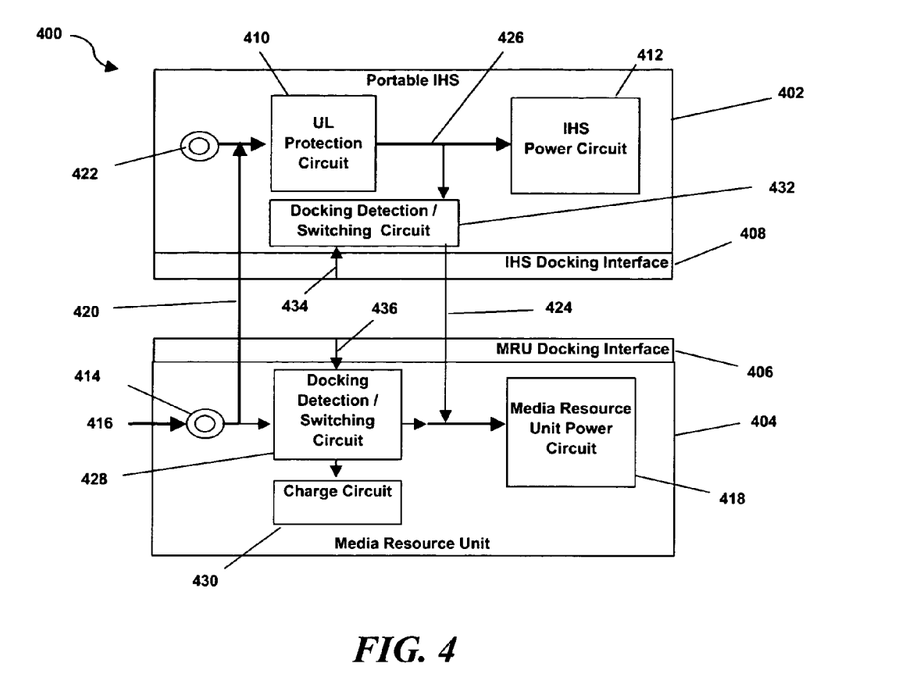
FIG. 4 illustrates a block diagram of an input power distribution topology for a portable information handling system and a media resource unit employing a rechargeable battery circuit according to one aspect of the disclosure.

FIG. 4 illustrates a block diagram of an input power topology, generally designated at 400, for a portable IHS 402 and an MRU 404 employing a rechargeable battery circuit according to one aspect of the disclosure. The portable IHS 402 can be coupled to the MRU 404 using an MRU docking interface 406 and an IHS docking interface 408. In one form, the portable IHS 402 can include the information handling system 100 depicted in FIG. 1. Additionally, the MRU 404 can include the media resource unit 200 depicted in FIG. 2. However, other information handling systems or media resource units can also be employed.

In an exemplary embodiment, the portable IHS 402 can include a UL protection circuit 410 that can be coupled to a first external input power port 422 of the portable IHS 402. The portable IHS 402 can further include an information handling system power circuit 412 that can be coupled to the UL protection circuit 410 to provide power to electronics (not illustrated) of the portable IHS 402. The portable IHS 402 may also include a docking detection and switching circuit 432 operably coupled to the UL protection circuit 410 and operable to output protected power using a docking interface 408.

In one form, the MRU 404 can also include a second external input power port 414 that can receive input power 416 from a charge adapter (not illustrated). The MRU 404 can also include a media resource unit power circuit 418 that can provide power to electronics (not illustrated) within the MRU 404. The system 400 can further include a first energy distribution circuit 420 that can be provided upon coupling the MRU docking interface 406 and the IHS docking interface 408. The first energy distribution circuit 420 can be used to couple to the second external charge port 412, the first external charge port 422, and the UL protection circuit 410. Additionally, the IHS docking interface 408 can further include an IHS docking input 434 operable to detect when the MRU docking interface 406 and the IHS docking interface 408 may be docked. The IHS docking input 434 can provide an input to the IHS docking detection and switching circuit 432. For example, the IHS docking input 434 can be logical high (e.g. approximately five (5) volts) when coupled and logical low (e.g. ground or approximately zero (0) volts) when decoupled. Similarly, the MRU docking interface 406 can include an MRU docking input 436 operable to detect when the MRU docking interface 406 and the IHS docking interface 408 may be docked. The MRU docking input 436 can provide an input to the MRU docking detection and switching circuit 428. For example, the MRU docking input 436 may be logical high (e.g. approximately five (5) volts) when coupled and logical low (e.g. ground or approximately zero (0) volts) when decoupled.

In one embodiment, the MRU input power detection and switching circuit 428 can be coupled between the second external input power port 414 and the media resource unit power circuit 418. The MRU 404 can further include a charge circuit 430 that can be used to charge a rechargeable battery (not illustrated) of the MRU 404. In one form, the MRU input power detection and switching circuit 428 and the IHS input power detection and switching circuit 432 can include a Metal Oxide Semiconductor Field Effect Transistor (MOSFET) circuit that can detect a coupling of the portable IHS 402 and the MRU 404. For example, when docking the HIS docking interface 408 and the MRU docking interface 406, a logical low can be provided as the IHS docking input 434 and the IHS docking detection and switching circuit 432 can be enabled to allow protected power 426 to be coupled to the MRU docking interface 406 using the docking detection and switching circuit 432 and the second power distribution circuit 424. Additionally, a logical high can be provided as the IHS input 436 to the IHS detection and switching circuit 428 to disable the IHS detection and switching circuit 428 and enable a coupling of the protected power 426 using the second power distribution circuit 424 to the media resource unit power circuit 418.

During operation, the MRU 404 can receive the input power 416 from a power source such as a charge adapter coupled to the second external input power port 414. For example, a user can plug a charge adapter into the second external input power port 414 and the input power 416 may be provided. The portable IHS 402 can receive the input power 416 using the first energy distribution circuit 420 when the portable IHS 402 and MRU 406 are docked or coupled. Upon providing the input power 416 to the IHS docking interface 408, the input power 416 can then be coupled to the UL protection circuit 410 of the portable IHS 402. The UL protection circuit 410 can output protected power 426 and to the IHS power circuit 412. Similarly, the protected power 426 can also be coupled to the MRU 404 using a second power distribution circuit 424 and docking detection and switching circuit 432 operable to couple the protected power 426 to the MRU 404. In this manner, the MRU 404 can use the UL protection circuit 410 of the portable IHS 402 to protect the input power 416 provided to the second external input port 414 of the MRU 404.

In one embodiment, the input power detection and switching circuit 428 can detect if the portable IHS 402 and the MRU 404 may be coupled. The input power detection and switching circuit 428 can also determine if the MRU 404 includes the charge circuit 430. For example, the portable IHS 402 may not be coupled to the MRU 404. As such, the input power and switching circuit 428 can route the input power 416 to the charge circuit 430 to charge or recharge a battery of the MRU 404 when the MRU 404 and the portable IHS 402 may not be docked. In another form, the charge circuit 430 may not be present or the rechargeable battery may be fully charged. As such, the input power detection and switching circuit 428 may not couple the input power 416 to the charge circuit 430. In this manner, the MRU 404 including the charge circuit 430 can charge a rechargeable battery when the MRU 404 and the portable IHS 402 may not be coupled or connected.

Figure 5:
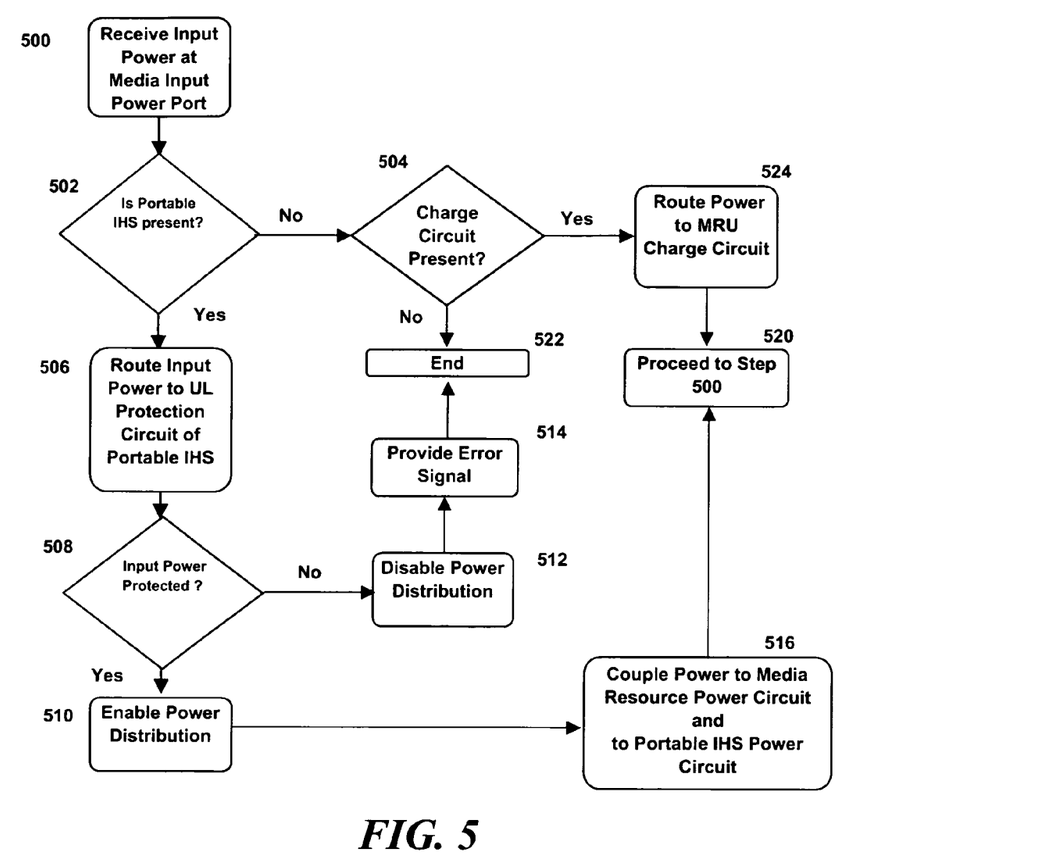
FIG. 5 illustrates a flow diagram of a method for accessing a protection circuit of an information handling system using a media resource unit according to one aspect of the disclosure.

FIG. 5 presents a flow diagram of a method for accessing a protection circuit of an information handling system using a media resource unit according to one aspect of the disclosure. The method can begin at step 500 when input power may be received at a media input power port of a media resource unit such as media resource unit 200 illustrated in FIG. 2 or other media resource units. For example, input power can be provided to a external input power port and at decision step 502, a portable information handling system (IHS) may not be coupled to the media resource unit. As such, the method may proceed to decision step 504 and determine an availability of charge circuit within the media resource unit. If a charge circuit is not present, the method proceeds to step 522 and ends. If a charge circuit is present within the media resource unit, the method proceeds to step 524 and proceeds to route power to the media resource unit's charge circuit for charging a rechargeable battery. The method then proceeds to step 520 where the method returns to step 500.

If at decision step 502, the media resource unit is coupled to a portable IHS, the method proceeds to step 506 and the input power can be routed to a UL protection circuit of the portable IHS. The method then proceeds to decision step 508 and determines if the input power received by the media resource unit includes protected power. If the input power does not include protected power, the method proceeds to step 512 and power distribution can be disabled to protect the media resource unit and the portable IHS. An error signal can also be provided at step 514 and the method can end at step 522. If at decision step 508 the input power can be protected, the method proceeds to step 510 and distribution of protected power is enabled and to step 516 where the protected power can be coupled to the information handling system power circuit and the media resource unit power circuit. The method then proceeds to step 520 and the method repeats at step 500.

The method of FIG. 5 is provided to illustrate one method of providing UL protected power in association with a media resource unit when used in combination with a portable information handling system. Other combinations of the method of FIG. 5 can be provided to accommodate other types of input power protection and distribution topologies as needed.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a first external input power port;
an information handling system docking interface operable to be coupled to a media resource unit interface of a media resource unit, wherein the media resource unit includes a second external input power port; and
a protection circuit, wherein:
the protection circuit includes a first terminal and a second terminal;
the first terminal is coupled to the first external power port;
the first terminal is operable to receive input power from the second external power port of the media resource unit; and
the second terminal is coupled to the information handling system docking interface and operable to output protected power to the media resource unit interface.

2. The system of claim 1, wherein the media resource unit docking interface is operable to provide the protected power to a media resource unit power circuit of the media resource unit.

3. The system of claim 1, wherein:
the first terminal receives the input power when the information handling system docking interface and the media resource docking interface are coupled; and
the second terminal outputs the protected power when the information handling system docking interface and the media resource docking interface are coupled.

4. The system of claim 1, further comprising the protection circuit operable to provide the protected power to an information handling system power circuit.

5. The system of claim 1, wherein the media resource unit docking interface is operable to provide access to the external resources of the media resource unit.

6. The system of claim 5, wherein:
the protected power is provided to the media resource unit to power electronics operable to be used as a resource for the information handling system; and
the media resource unit docking interface is further operable to provide an output of the resource powered using the protected power to the information handling system using the information handling system docking interface.

7. The system of claim 1, further comprising:
a rechargeable battery provided within the media resource unit and operable to be charged using the input power of the second external input power port in response to a decoupling of the media resource unit docking interface and the information handling system docking interface; and
a docking status signal operable to provide a docking status of the media resource unit interface to the information handling system docking interface.

8. The system of claim 1, wherein the media resource unit further comprises:
a detection and switching circuit operably coupled to the media resource unit docking interface and operable to detect a coupling of the media resource unit docking interface and the information handling system docking interface; and the detection and switching circuit further operable to couple the input power provided by the second external input power port to a portion of the media resource unit docking interface in response to detecting the coupling of the media resource unit docking interface and the information handling system docking interface.

9. The system of claim 8, wherein the detection and switching circuit is further operable to provide the input power to a charge circuit of the media resource unit.

10. The system of claim 1, further comprising:
a first terminal operable to provide the input power from the second external input power port to the protection circuit of the information handling system, the input power coupled prior to being protecting by the media resource unit; and
a second terminal operable to provide the protected power provided by the protection circuit of the information handling system to the media resource docking interface.

11. A method of providing protected power within an information handling system, the method comprising the steps of:
detecting a coupling of an information handling system and a media resource unit;
receiving input power from an external input port of the media resource unit;
providing the input power to an input terminal of a protection circuit of the information handling system;
regulating the input power to produce a protected power. wherein a power level of the protected power is below a damaging power level for the information handling system and the media resource unit; and
distributing protected power from an output terminal of the protection circuit to the media resource unit.

12. The method of claim 11, further comprising providing the protected power to the media resource unit when a media resource unit docking interface is coupled to an information handling system docking interface.

13. The method of claim 12, further comprising:
detecting an uncoupling of the media resource unit and the information handling system; and
routing the input power to the rechargeable battery circuit in response to the uncoupling.

14. The method of claim 11, further comprising:
routing the input power from the external input power port of the media resource unit to a second external input port of the information handling system; and protecting the input power using the protection circuit of the information handling system prior to providing the input power to electronics of the media resource unit.

15. The method of claim 11, further comprising accessing at least one resource powered using the protected power provided by the protection circuit of the information handling system.

16. A media resource unit comprising:
an external input power port operable to receive input power from an external source;
a media resource unit docking interface operable to be coupled to an information handling system docking interface;
an energy distribution circuit operable to provide the input power to an external input power port of the information handling system and a protection circuit of the information handling system, the energy distribution circuit provides power when the media resource unit docking interface and the information handling system docking interface are coupled;
an energy distribution circuit output operable to provide the input power from the external input power port to the information handling system, the input power provided prior to being protected; and
a media resource power circuit operable to receive the protected power provided by the protection circuit of the information handling system.

17. The unit of claim 16, further comprising:
a detection and switching circuit operable to detect a coupling of the information handling system docking interface and the media resource unit docking interface; and
the detection and switching circuit operable to couple the input power to a charge circuit of the media resource unit in response to detecting a decoupling of the information handling system docking interface and the media resource unit docking interface.

18. The unit of claim 16, further comprising a resource operable to be accessed upon powering using the protected power provided by the protection circuit of the information handling system.

19. The unit of claim 18, further comprising a charge circuit operable to charge a rechargeable battery using the input power when the media resource unit docking interface and information handling circuit docking interface are not coupled.

* * * * *